(12) United States Patent
Lee

(10) Patent No.: US 9,673,597 B2
(45) Date of Patent: Jun. 6, 2017

(54) WALL CLAMPING JUNCTION BOX

(71) Applicant: DMF, Inc., Carson, CA (US)

(72) Inventor: Nathan Lee, Lakewood, CA (US)

(73) Assignee: DMF Inc., Carson, CA (US)

(*) Notice: Subject to any disclaimer, the term of this patent is extended or adjusted under 35 U.S.C. 154(b) by 0 days.

(21) Appl. No.: 14/791,249

(22) Filed: Jul. 2, 2015

(65) Prior Publication Data

US 2017/0005460 A1    Jan. 5, 2017

(51) Int. Cl.
*H02G 3/12* (2006.01)

(52) U.S. Cl.
CPC .................. *H02G 3/121* (2013.01)

(58) Field of Classification Search
CPC combination set(s) only.
See application file for complete search history.

(56) References Cited

U.S. PATENT DOCUMENTS 5,571,993 A * 11/1996 Jones ............... H02G 3/185
174/57
5,603,424 A * 2/1997 Bordwell ............ H02G 3/123
220/3.5
6,170,685 B1 * 1/2001 Currier ............. H02G 3/121
220/3.2

* cited by examiner

*Primary Examiner* — Dhirubhai R Patel
(74) *Attorney, Agent, or Firm* — Natan Epstein

(57) ABSTRACT

An enclosure such as an electrical junction box has fixed clamping flanges exterior to the enclosure, screws rotatable relative to the enclosure and operative for drawing clamping brackets from an initial elevated position towards the clamping flanges for clamping the edges of an opening cut in drywall or the like, thereby to fasten the enclosure inside a wall or ceiling. The clamping brackets are initially retracted in the enclosure and rotation of the screws releases the brackets to an extended clamping position relative to the clamping flanges.

16 Claims, 6 Drawing Sheets

WALL CLAMPING JUNCTION BOX

FIELD

This invention relates to junction boxes and housings used in residential and commercial construction to enclose electrical wiring and recessed light fixtures against fire and electrical hazards.

BACKGROUND

Municipal construction codes generally require that electrical wiring, particularly in-wall wiring, be contained in fire resistant protective conduit, usually metal conduit. Where two or more electrical wires are connected the outer protective conduit must be cut or terminated in order to join the interior electrical conductors to each other. The resulting gap in protective conduit is bridged with a junction box which provides continuity of enclosure between multiple wire conduits. The ends of metal conduits are joined to the walls of the junction box while electrical wires in the conduits enter through openings in the box walls into the junction box where the wires may be interconnected with each other, e.g. with electrical nut fasteners. In the event of an electrical overload, short circuit or similar anomalous condition which causes overheating or sparking, the fire resistant junction box contains and prevents ignition of nearby flammable materials. Construction codes typically require that junction boxes meet a minimum standard of protection, e.g. two hours of protection at a given exterior temperature.

With the advent of compact light fixtures based on LED (light emitting diode) technology, it becomes possible to house small compact light fixtures directly in the junction box itself, thereby eliminating the need for the bulky and awkward sheet metal lamp housing. The relatively small junction box serves as a fire resistant enclosure for both the power supply wiring and for the light fixture itself.

In new construction, junction boxes are easily fastened to the rigid building frame, such as ceiling joists or wall studs, before drywall or other wall and ceiling material is installed. After the electrical connections are made, the wall or ceiling is then installed over the junction box, with holes cut in the ceiling or wall material for access to the boxes before being fixed into place.

In remodel construction requiring installation of junction boxes, however, it is difficult to access the building frame without removing the wall or ceiling surface first, i.e. tearing off dry wall sheet and the like. This is a labor intensive and expensive process. There is a category of junction boxes on the market specifically made for remodel construction that do not require the removal of wall and ceiling to install. These require a hole to be cut in the existing wall or ceiling surface, electrical connections to be made, and then the junction box is installed through the hole from the outside. These junction boxes have a mechanism for attaching the box to the ceiling surface, e.g. to the dry wall sheet covering, instead of to the building frame.

These remodel junction boxes typically require either an irregularly shaped hole to be cut, a clamping tab to be manually set into position before installation, a fastener to be applied to the fragile wall surface, or a combination of the these. Many of these products are designed for a single installation, damaging both the wall and the junction box if removed.

A continuing need exists for an improved wall clamping junction box.

SUMMARY OF THE INVENTION

This invention provides an improved electrical junction box and lamp housing which is easier to install in remodel or retrofit work.

The improved junction box clamps to a surrounding wall, which is normally surrounding drywall sheet, in a substantially fire resistant joint to provide a continuous protective partition between the interior of the junction box and the ceiling space above the dry wall, while an open bottom of the junction box accessible from beneath the ceiling permits installation and servicing of compact lamp modules and associated wiring.

The clamping junction box has a top wall between four or more side walls and an open bottom. A pair of outer flanges extend from the exterior of opposite side walls which also each have a vertical slot between the top wall and the corresponding outer flange.

A clamping bracket is slidable in each of the slots and a pair of clamping screws each threaded to one bracket is captive to the box. Each screw is rotatable for drawing a corresponding clamping bracket along its slot from an initial elevated position towards the corresponding outer flange, such that a wall edge adjacent to the box side walls is clamped between the brackets and the outer flanges thereby fastening the box to the wall.

The clamping screws are tiltable between an initial inclined position in which the clamping brackets are retracted into the box and an upright position where the brackets are extended from the box.

A spring on each screw urges the screw towards the upright condition and the corresponding clamping bracket toward an initial elevated position against an upper end of the corresponding slot. A detent on the bracket engages the side wall to keep the bracket in its retracted position and the screw in the tilted position.

The detent releases when the screw is turned to move the bracket down along the screw, freeing the screw which is righted from the tilted position by the spring, thereby extending the bracket out of the box through the slot in the side wall from its retracted position.

These and other improvements, features and advantages of this invention will be better understood by reference to the following detailed description of the preferred embodiments taken in conjunction with the accompanying drawings.

DETAILED DESCRIPTION OF THE PREFERRED EMBODIMENT

Figure 1:
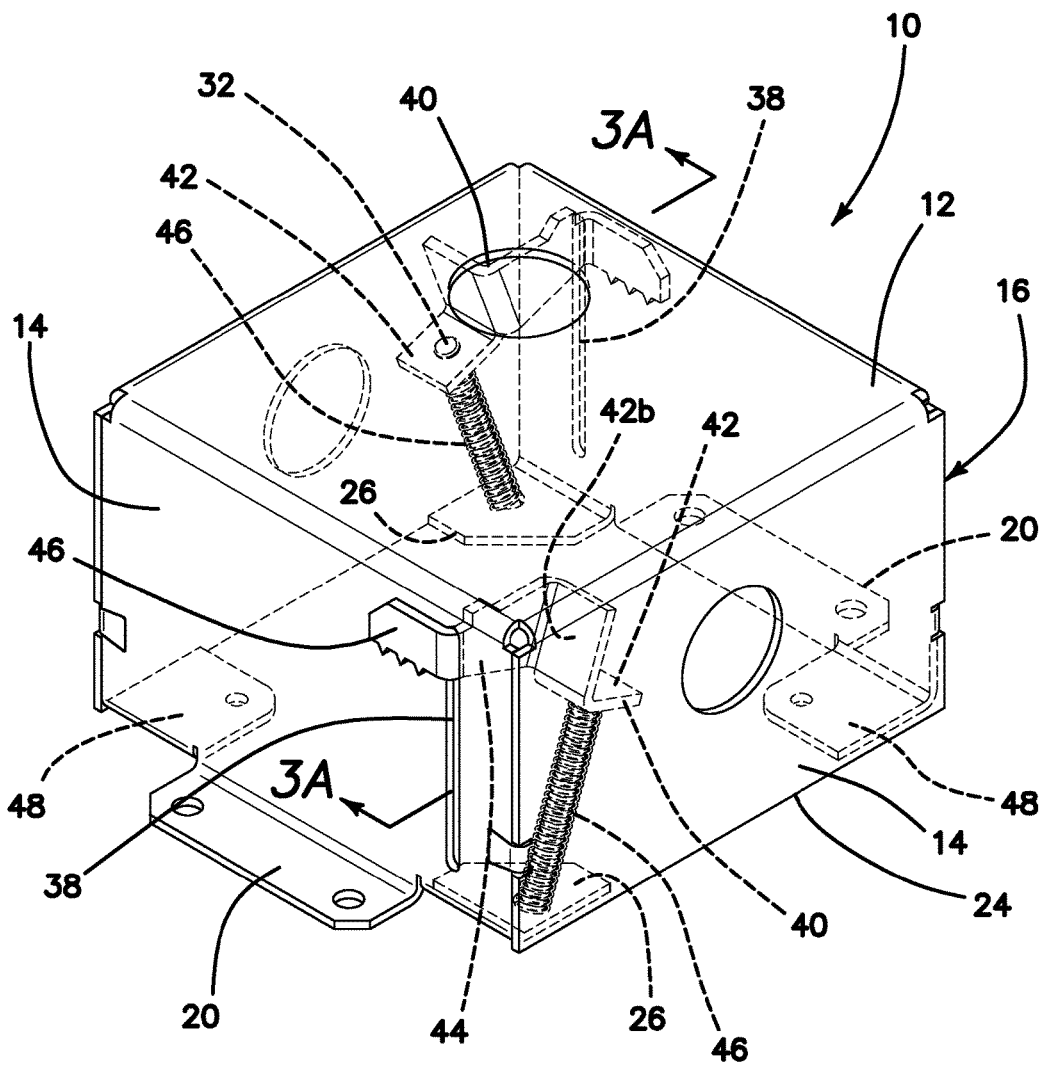
FIG. 1 is a top side perspective view of a clamping junction box according to this invention, shown with the clamping brackets held retracted into the box and the clamping screws tilted.

With reference to the accompanying drawings wherein like elements are designated by like numerals, FIG. 1 shows a wall clamping junction box generally designated by numeral 10 which has a rectangular top wall 12 and four side walls 14 defining a generally rectangular enclosure 16 with an open bottom 18 bounded by the four side walls 14. The enclosure 16 may be of sheet metal similar to electrical junction boxes currently in general use. A number of knock-out openings 22 are provided in top wall 12 and side walls 14, which may be individually opened as needed to receive electrical conduit and admit electrical conductors into box 10.

A pair of rigid clamping flanges 20 extend horizontally away from lower edges 24 of opposite side walls 14. A pair of screw bearing flanges 26 are supported in diagonally opposed corners between contiguous side walls 14. Each screw bearing flange 26 is perforated with a screw hole 28 sized to loosely pass the threaded shaft 32 of a machine screw 30 upward into box enclosure 16 while making an interference fit with screw head 34 of screw 30 against the underside of flange 26. The two screws 30 are loosely held in in screw holes 28 of respective flanges 26, where each screw 30 is free to rotate and move axially through flange 26 and each screw 30 is free to tilt away from the vertical in box enclosure 16.

Two vertical slots 38 are cut in the two opposite side walls 14 which carry the clamping flanges 20. Each slot 38 is generally parallel and adjacent to one of the two screws 30. A pair of clamping brackets 40 each have an inner portion 42 with a screw hole 42a through which is threaded shaft 32 of each screw 30 and a mid-portion 44 slidable between upper slot end 38a and lower slot end 38b in a corresponding slot 38. Bracket midportion 44 extends to the exterior of box enclosure 16 through slot 38 and terminates in an end portion 46 shaped to interfere with passage through slot 38 into enclosure 16. As shown in FIG. 1, end portion 46 is bent transversely to mid-portion 44 and lies flat against the outside of side wall 14 in the maximally retracted position of bracket 40 into box enclosure 16, preventing further entry of the bracket into the enclosure, and limiting tilting of the screw 30. In this position bracket 40 also supports screw 30 in a maximally tilted position away from the vertical, as shown in the same FIG. 1.

A coil spring 46 lies coaxially along each screw shaft 32 in axial compression between bearing flange 26 and inner portion 42 of bracket 40. The length of coil spring 46 is such as to remain in compression when bracket inner portion 42 is in an initial maximally elevated position on screw shaft 32 as shown in FIG. 1, with an upper edge 44a of the bracket mid-portion 44 abutting against the upper end 38a of slot 38. The force of spring 46 holds the screw head 34 in interference against the underside of flange 26 and keeps the screw shaft 32 above flange 26 in box enclosure 16.

The compressed spring 46 normally urges the shaft 32 towards an upright, vertical position because tilting of the screw shaft tends to further compress the coil spring 46 between the flat surfaces presented by flange 26 and bracket inner portion 42. One side of the lower end of spring 46 is pressed against flange 26 and pushed upwards along screw shaft 32 when screw 30 is tilted relative to flange 26. The spring seeks to minimize its compression by righting the screw shaft towards the vertical relative to the horizontal top surface 26a of flange 26, and consequently normally urges screw 30 towards a vertical position substantially parallel to side walls 14. This tendency of compressed spring 46 is opposed by a detent in the form of detent tab 48 which rises from the upper edge 44a of bracket mid-portion 44. With bracket 40 maximally elevated in slot 38, detent tab 48 rises above the upper end 38a of the slot and prevents bracket 40 from moving outwardly through slot 38. Detent tab 48 is held in engagement with the upper end 38a of slot 38 by the force of compressed spring 46 which urges screw 30 upwards through its hole 28 in flange 26 and lifts bracket 40 against slot upper end 38a, thereby holding bracket 40 in the retracted position shown in FIGS. 3A and 3B.

Figure 2:
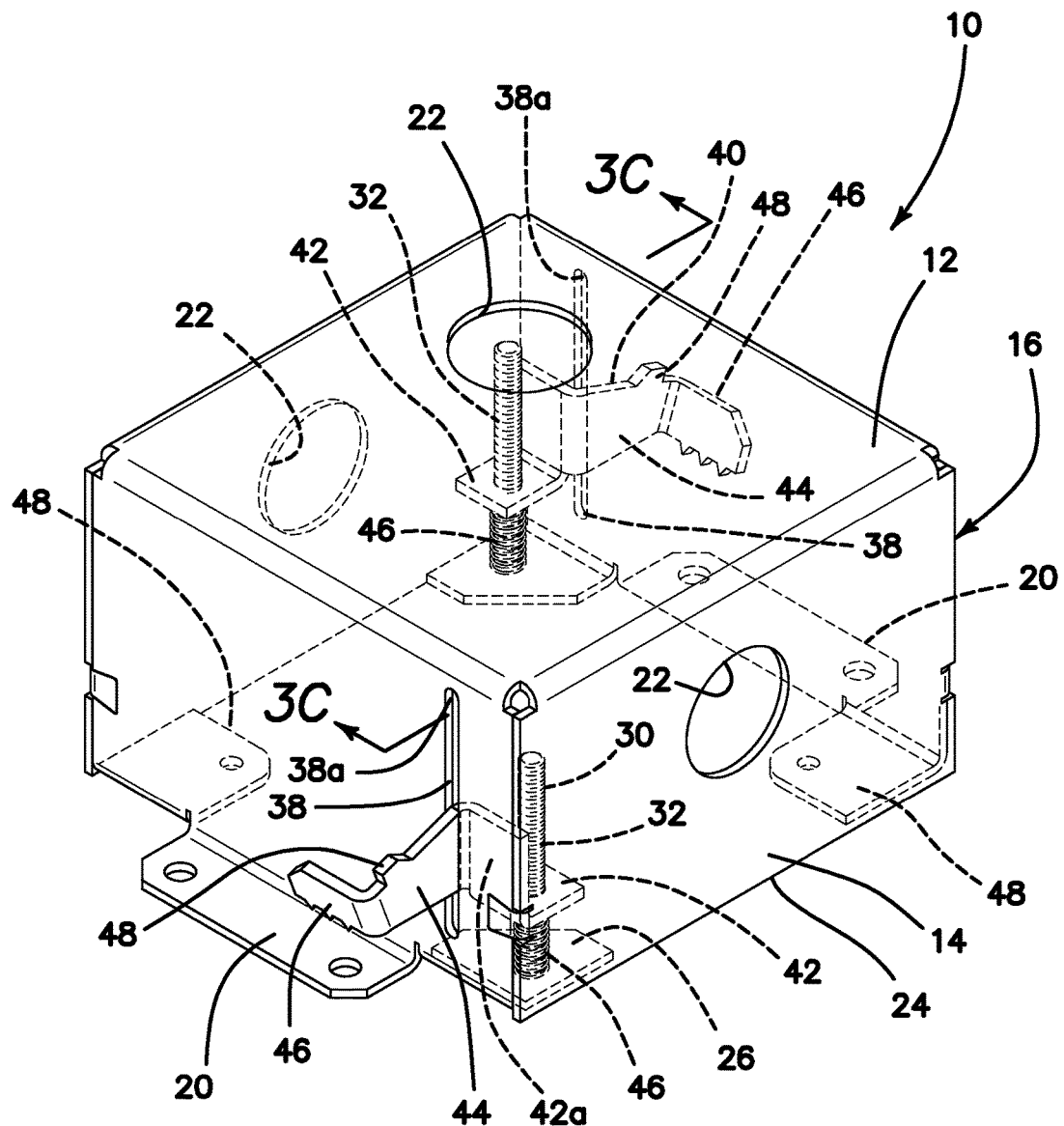
FIG. 2 is a view as in FIG. 1 with the clamping brackets extended from the box and the clamping screws in upright position.
Figure 3A:
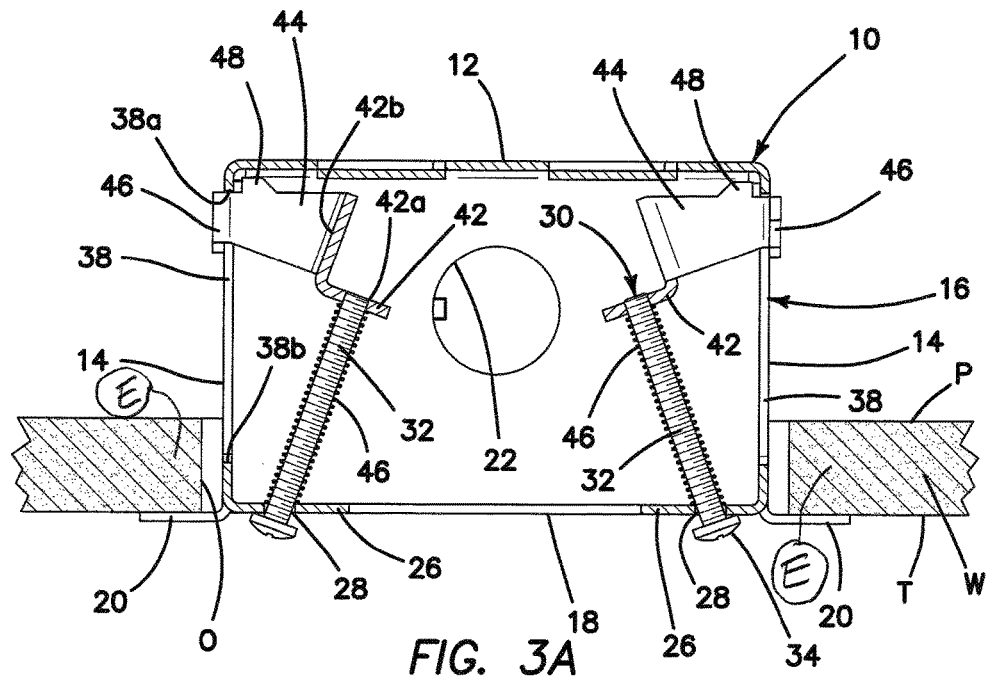
FIG. 3A is a side elevational section taken along line 3A-3A in FIG. 1 showing the box in initial condition for installation with clamping brackets retracted and clamping screws tilted as in FIG. 1, with the box inserted for installation in an opening cut in a sheet of dry wall.
Figure 3B:
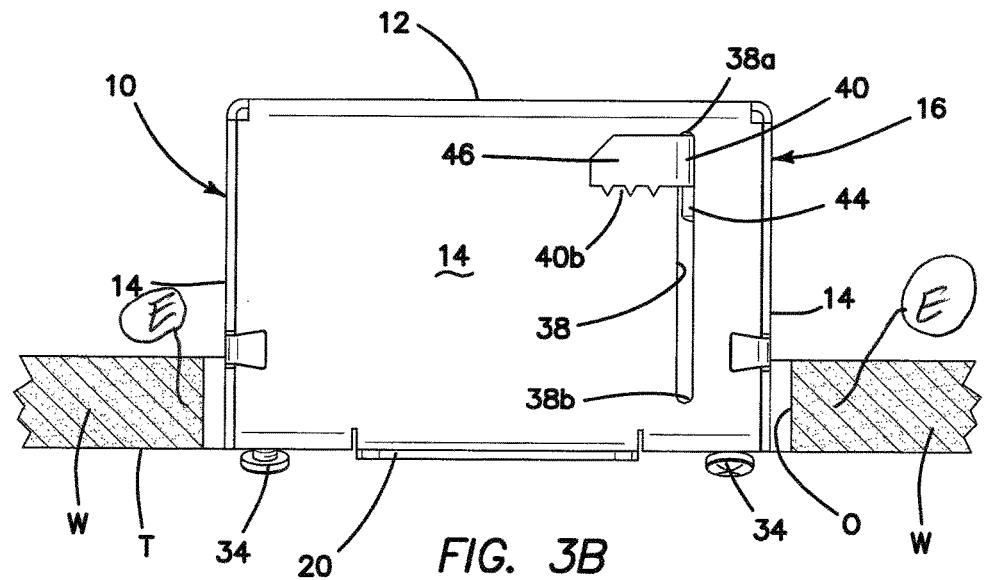
FIG. 3B is a side elevational view of the junction box of FIG. 3A showing the exterior end of a clamping bracket retracted against a side wall of the junction box in the condition also shown in FIG. 3A.

Bracket 40 is released from its maximally retracted position of FIGS. 1, 3A and 3B by turning screw 30 so as to draw inner portion 42 of bracket 40 down along screw shaft 32. This action brings detent tab 48 below the upper end 38a of slot 38, allowing the bracket mid-portion 44 to move outwardly through slot 38 under urging of spring 46 until stopped by stop face 42b of bracket inner portion 42 abutting against the inner surface of side wall 14, a condition illustrated in FIGS. 2, 3C and 3D. In this maximally extended position brackets 40 may be drawn down along screw shafts 32 and along slots 38 towards the underlying clamping flanges 20 by further turning of screws 30.

Figure 5:
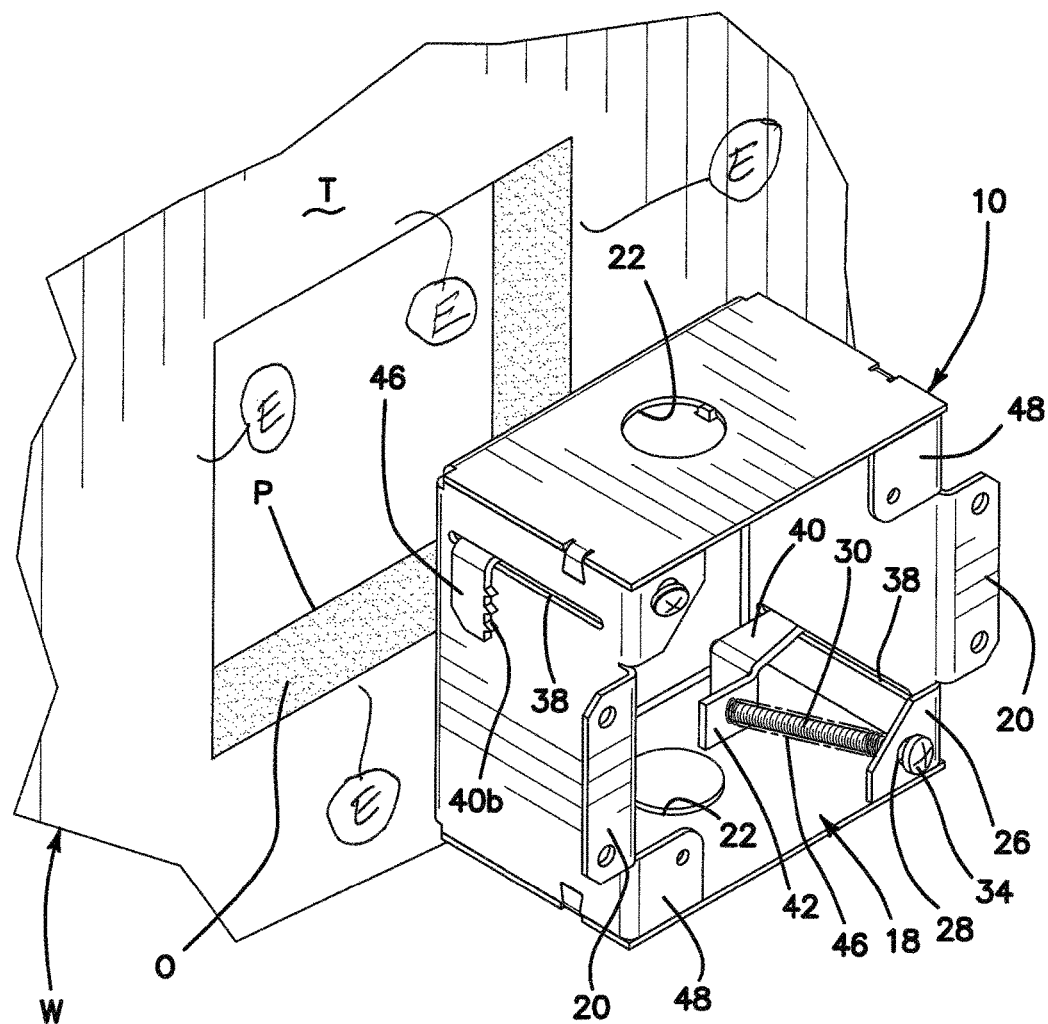
FIG. 5 shows in perspective view how the junction box of this invention is advanced into an installation opening cut in a wall or ceiling covering such as a sheet of dry wall material.

Junction box 10 is installed in a wall or ceiling by first cutting a rectangular opening O in the exterior dry wall sheet W, or other wall or ceiling surface covering, as illustrated in FIG. 5. Opening O is made slightly oversized to the rectangular perimeter side walls 14 of enclosure 16, with a small allowance for passing the thickness of outer portions 46 of the two clamping brackets 40. The edges of the wall opening O may be four straight edges in a rectangle slightly greater than top wall 12 of the junction box. The junction box 10 is installed with brackets 40 in the initial retracted condition shown in FIGS. 1, 3A and 3B. Box 10 is introduced into the wall or ceiling interior by advancing top wall 12 into the wall opening O until clamping flanges 20 abut against the outer surface T of the dry wall sheet W and the clamping flanges 20 lie against edge portions of the drywall adjacent to side walls 14, as seen in FIG. 3A.

Figure 3C:
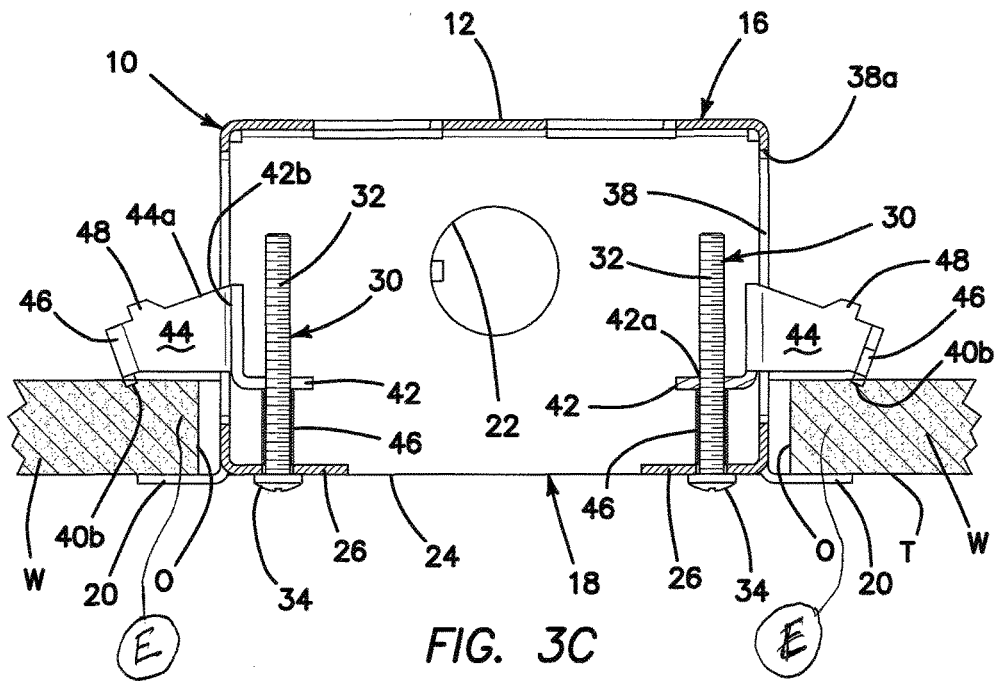
FIG. 3C is a side elevational section taken along line 3C-3C in FIG. 2 showing the clamping brackets released to an extended position and lowered along corresponding slots into clamping engagement with the sheet of dry wall, and the clamping screws righted to an upright position by the compressed coil spring on each screw.
Figure 3D:
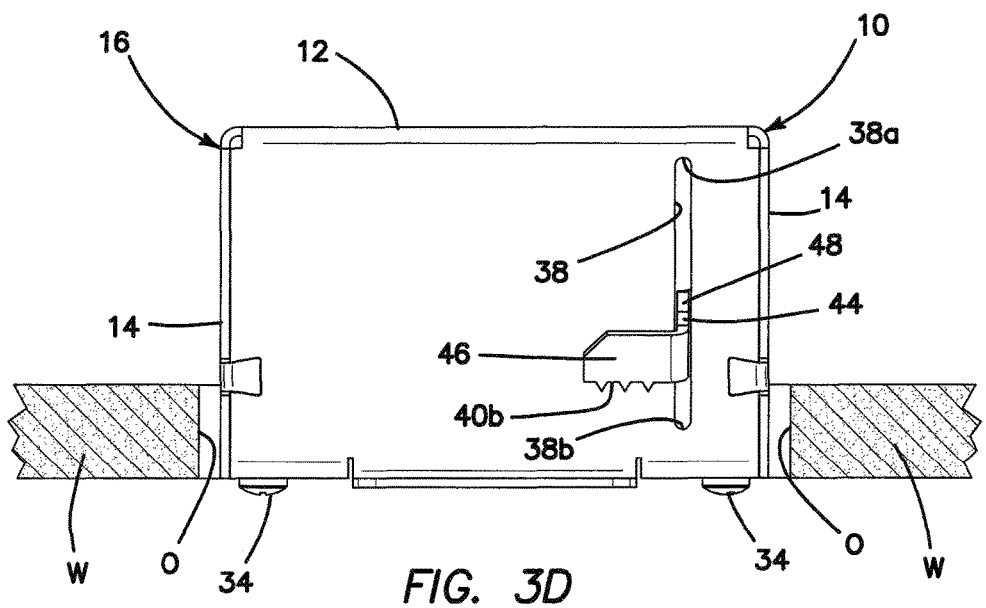
FIG. 3D is a side elevational view of the junction box of FIG. 3C showing the exterior end of a clamping bracket lowered along its slot into clamping engagement with the sheet of dry wall as also shown in FIG. 3C.
Figure 4:
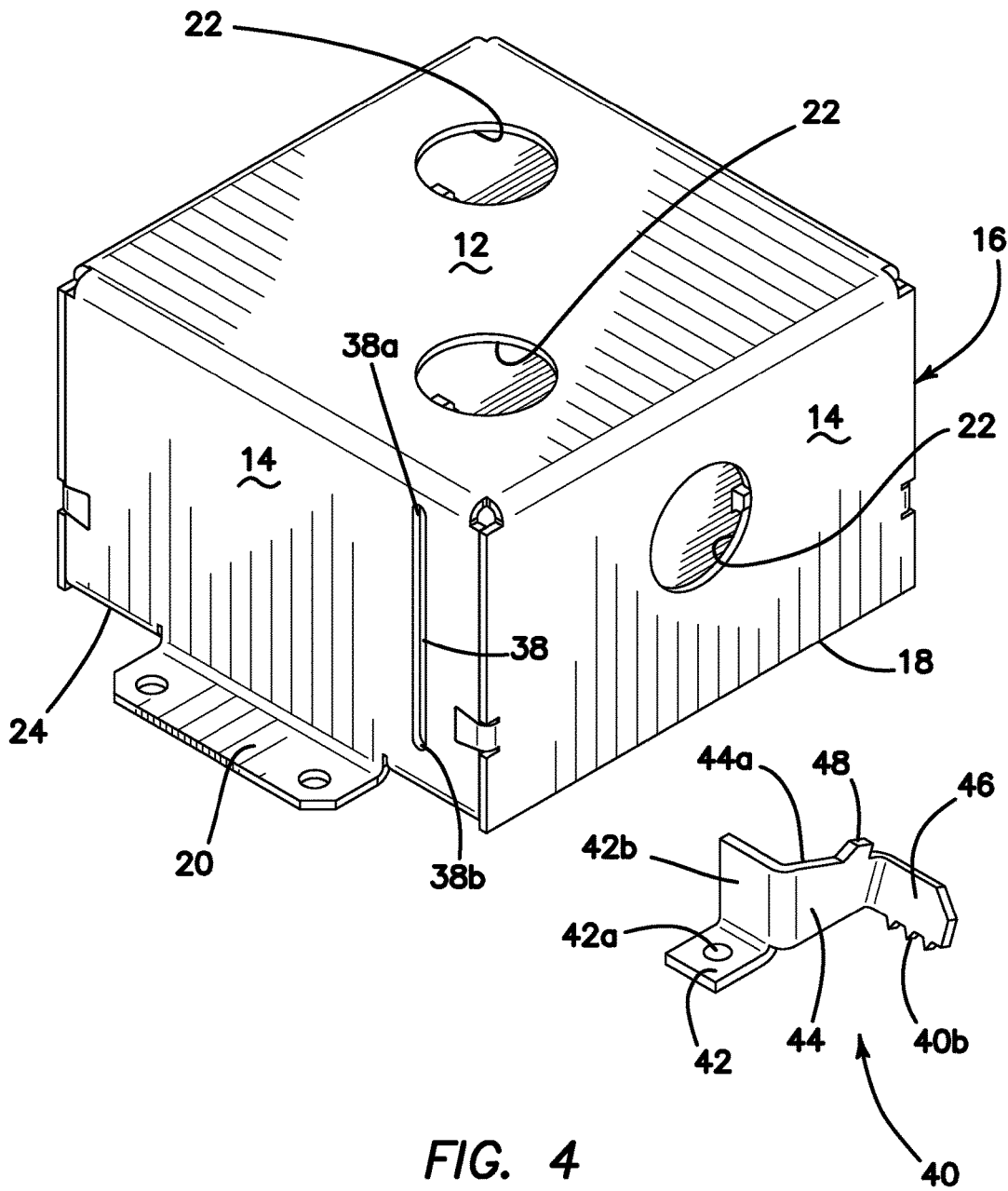
FIG. 4 shows in perspective view a junction box housing and a clamping bracket disassembled from the junction box housing.

Screws 30 are then turned to release brackets 40 from their initial retracted position of FIG. 1, and further turned to draw down the clamping brackets 40 along screw shafts 32 towards the inner surface of the drywall sheet W until the preferably serrated lower edges 40b of brackets 40 press and bite into the inside surface P of dry wall sheet W, as seen in FIG. 3C, clamping the dry wall sheet W between the flanges 20 and brackets 40. Preferably, screws 30 are tightened sufficiently until edges 40b of brackets 40 cut and press somewhat into the dry wall surface P to secure box 10 against possible displacement relative to the wall or ceiling.

The clamping mechanism described herein is not limited to application in electrical junction boxes but may be incorporated in a variety of boxes, housings, enclosures and other structures intended for mounting inside walls or ceilings.

While a presently preferred embodiment of the invention has been described and illustrated for purposes of clarity and example it must be understood that various changes, modifications and substitutions to the described embodiment will be apparent to those having no more than ordinary skill in the art without departing from the scope of this invention as defined by the following claims.

What is claimed is:

1. A wall clamping box for installation between wall edges of an opening defined in a wall, comprising:
    a housing having a plurality of side walls between a top and a bottom;
    a pair of outer flanges exterior to an opposite two of said side walls;
    a pair of slots in said opposite two of said side walls;
    a clamping bracket slidable in each of said slots; and
    a pair of clamping screws captive to said housing and threaded to said clamping brackets, said screws rotatable for drawing said brackets along said slots from an initial elevated position towards said outer flanges;
    said brackets moving through said slots from an initial retracted position in said initial elevated position to an extended position responsive to rotation of said screws;
    such that a pair of said wall edges adjacent to said side walls is clamped between the extended brackets and said outer flanges thereby fastening said box to said wall.

2. The junction box of claim 1 wherein said clamping screws are tiltable between an initial inclined position wherein said brackets are retracted into said housing and an upright position wherein said brackets are extended from said housing.

3. The junction box of claim 2 further comprising a spring on each of said screws operative for urging said each screw with a corresponding one of said brackets toward said upright position; and
    a detent on each of said brackets engageable with an upper end of a corresponding of said slots in said initial elevated position for keeping said bracket in said retracted position.

4. The junction box of claim 3 wherein said spring is operative for righting said screw from said tilted position toward said upright position upon disengagement of said detent by displacement of said bracket towards said outer flanges thereby to release said bracket toward said extended position through said slot from said retracted position.

5. The junction box of claim 3 wherein said spring is a coil spring loosely coaxial with said screw.

6. A wall clamping junction box for installation between wall edges of an opening defined in a wall, said box having a top between a plurality of side walls and a bottom;
    a pair of outer flanges exterior to opposite ones of said side walls;
    a pair of clamping brackets each threaded to a screw shaft of a corresponding clamping screw, said clamping screw rotatable in screw holes in said box so as to draw one of said brackets from an initial elevated position towards said outer flanges such that a wall edge adjacent to one of said side walls is clamped between each of said brackets and said outer flanges thereby fastening said box to said wall;
    each said clamping screw being tiltable between an initial inclined position with said brackets retracted into said box and an upright position with said brackets extended from said box;
    spring means normally urging each said clamping screw towards said upright position;
    detent means for holding said brackets in said retracted position and said clamping screw in said initial inclined position, said detent means releaseable by turning said clamping screw for downward displacement of a corresponding one of said brackets along said clamping screw thereby releasing said screw towards said upright position for extending said brackets to a clamping position relative to said clamping flanges.

7. The junction box of claim 6 wherein each said screw is rotatable and slidable in a screw opening through a corresponding screw flange attached to said box; and said spring means are in compression between each said screw flange and a clamping bracket threaded to said screw.

8. The junction box of claim 7 wherein each said clamping screw has a screw head in interference with an underside of said screw flange thereby to limit upward displacement of said clamping screw through said screw flange under urging of said spring means.

9. The junction box of claim 6 wherein each said bracket detent is a tab on an upper edge of said clamping bracket for engaging an upper end of said slot to keep said clamping bracket retracted and said clamping screw tilted, said detent tab moving into said slot and disengaging from said slot upper end upon downward displacement of said clamping bracket along said clamping screw thereby freeing said clamping screw from said tilted position towards said upright position under urging of said compressed spring such that said clamping bracket is pushed out through said slot to said extended position on the freed clamping screw.

10. The junction box of claim 6 wherein each said clamping bracket has an inner portion threaded to a said clamping screw, an outer end portion for limiting tilting of said screw and a stop face for limiting extension of said clamping bracket.

11. The junction box of claim 6 said spring means comprising a coil spring coaxial on each of said screws operative for urging said clamping screw with a said clamping bracket toward said initial elevated position in a corresponding one of said slots with an upper edge of said bracket against an upper end of said corresponding slot; and
    said detent comprising a tab on said upper edge of said bracket engageable with said side wall in said elevated position for keeping said bracket in said retracted position under urging of said coil spring.

12. The junction box of claim 6 wherein said spring means is operative for righting said screw from said tilted position upon release of said detent by downward displacement of said bracket along said screw thereby to extend said bracket through said slot from said retracted position.

13. An enclosure for installation between wall edges of an opening defined in a wall, said enclosure having a plurality of side walls between a top and an open bottom;
    clamping flanges on said side walls exterior to said enclosure;
    screws rotatable in screw holes of said enclosure
    clamping brackets each in threaded engagement with one of said screws and responsive to rotation of said screws for movement towards said flanges from an initial elevated position such that a pair of wall edges adjacent to said side walls is clamped between said brackets and said clamping flanges thereby fastening said enclosure to the said wall;

said clamping brackets being initially held in a retracted position in said enclosure, said rotation of said screws being operative for releasing said brackets through corresponding slots in said side walls to an extended clamping position relative to said clamping flanges.

14. The enclosure of claim 13 wherein said clamping brackets are displaceable along said slots responsive to said rotation of said screws.

15. The enclosure of claim 13 further comprising detent means for holding said brackets retracted into said enclosure in said initial elevated condition of said brackets and releaseable in response to said rotation of said screws.

16. The enclosure of claim 15 further comprising spring means urging said brackets to said extended clamping condition upon release of said detent means.

\* \* \* \* \*